United States Patent
Nachtigall et al.

(10) Patent No.: US 6,686,584 B2
(45) Date of Patent: Feb. 3, 2004

(54) MOVEMENT GIVER HAVING BODY WITH AFTER-GLOWING SURFACE

(76) Inventors: Christoph Nachtigall, Brucknerstrasse 33, Offenburg (DE), D-77654; Ulrich Mescheder, Am Wannenweg 23, Furtwangen (DE), D-78120

( * ) Notice: Subject to any disclaimer, the term of this patent is extended or adjusted under 35 U.S.C. 154(b) by 168 days.

(21) Appl. No.: 09/832,318

(22) Filed: Apr. 10, 2001

(65) Prior Publication Data

US 2001/0038377 A1 Nov. 8, 2001

(30) Foreign Application Priority Data

Apr. 18, 2000 (DE) .................................. 100 19 346

(51) Int. Cl.[7] .................................................. G09G 5/00
(52) U.S. Cl. ...................... 250/221; 345/156; 345/166; 345/179
(58) Field of Search ............................. 250/221, 222.1; 200/DIG. 29; 178/18.01; 318/640; 378/8; 345/156, 163–167, 75.1, 76, 179, 181; 324/207.11, 207.13, 207.23–207.25; 341/22, 35

(56) References Cited

U.S. PATENT DOCUMENTS 4,803,737 A * 2/1989 Sato et al. .................... 382/65
4,882,581 A * 11/1989 Inobe et al. .................. 341/22
5,831,553 A 11/1998 Lenssen et al. ............... 341/20
6,483,499 B1 * 11/2002 Li et al. ....................... 345/179

FOREIGN PATENT DOCUMENTS

| EP | 0 416 870 | 3/1991 |
|---|---|---|
| EP | 0 729 112 | 8/1996 |
| GB | 2 272 763 | 5/1994 |
| WO | WO 94/22971 | 10/1994 |
| WO | WO 98/36346 | 8/1998 |

* cited by examiner

Primary Examiner—Stephone B. Allen
(74) Attorney, Agent, or Firm—Baker & Daniels

(57) ABSTRACT

The invention relates to movement-givers, especially for controlling the cursor of a computer, with a body-movement sensor pair for the determination of a relative body surface movement and sensor movement. It is provided here that the body has an after-glowing surface, that the movement sensor has a light source for the generation of an after-glowing spot on the body surface, the body-movement sensor pair being constructed for a relative movement of the after-glowing surface and of the light source, and the movement-sensor comprises, further, a position-sensitive photo-detector which is designed to detect the position of the after-glowing spot.

18 Claims, 3 Drawing Sheets

Figure 5:
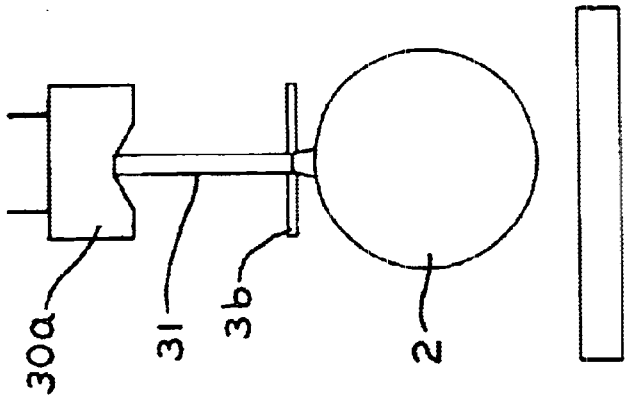

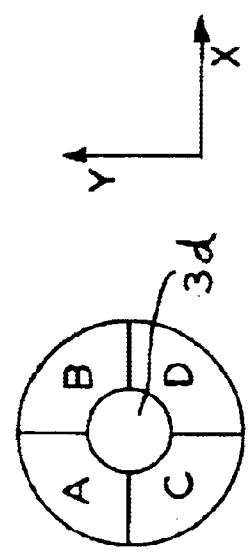
FIG._2
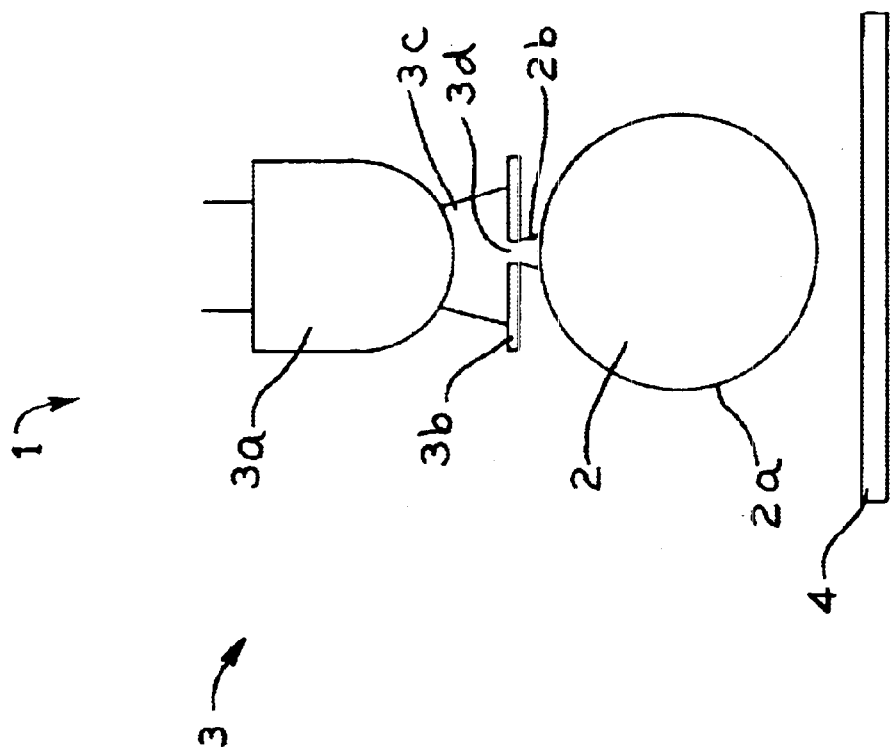
FIG._1

MOVEMENT GIVER HAVING BODY WITH AFTER-GLOWING SURFACE

The present invention relates to a movement giver (or actuator) according to the generic term of the independent claim.

Movement givers per se are known. In computer technology, movement givers are used as computer mice, trackballs and the like for the control of the computer cursor. In a conventional computer mouse there is present a ball, turnably borne and partially overhanging a housing surface, which rotates when the housing surface of the mouse is moved over a surface. The rotation of the ball then is measured on two axes.

Besides the mechanical scanning by accompanying rollers, there was proposed for this a large number of arrangements for the detection of movement. A first example is described in EP 0 729 112, which discloses a ball with conductive surfaces insulated from one another, the movement of which is read with capacitor plates integrated into the bearing.

U.S. Pat. No. 5,831,553 discloses an arrangement with a non-magnetic ball into which soft-magnetic particles are admitted. By means of a permanent magnet a magnetic field is generated around the ball from the outside. Between permanent magnet and ball then a magnetic field sensor is arranged. The magnetic field lines run there on the ball surface in dependence on the particle orientation. With a sensor between permanent magnet and ball, changes of the magnetic field are detected, and therewith ball rotations.

In WO 98/36346 it has been proposed magnetically to mark a magnetizable ball locally with a writing head, in order to detect the markings position with reading heads after rotation, and then to erase them (markings) with an erasing head.

Further, from GB 2 272 763 it is known to illuminate an unstructured ball with a laser, and to detect the laser speckles pattern that changes under the ball movement, in order from their change in position to obtain information about the movement direction and the speed of the ball. The evaluation algorithms for determining the movement direction and speed, however, are complicated.

It has also already been proposed, to detect the reflection of a surface with reflection points for the detection of movement, compare WO 94/22971.

It has been proposed, furthermore, to use a structured ball in a computer mouse, with which the position of the structures can be scanned optically, magnetically, capacitively or galvanically, compare EP 0 416 870.

In the state of the art there are problems to the effect that the arrangements used, insofar as technically realizable, are not economical, in which context especially the computing load of the computer through the evaluating process is expensive because thereby higher computing performances are required.

The problem of the present invention lies in making available new information for the industrial application.

The solution of this problem is claimed independently. Preferred forms of execution are found in the subclaims.

There is proposed, therefore, first of all a movement giver especially for control of a computer cursor, with a movable body and a movement sensor for the detection of a body movement, in which it is further provided that the movable body has an after-glowing surface and the movement sensor has a light source for the generation of an after-glowing light spot on the movable body, and a position-sensitive photo-detector, in order to make it possible to track the movement of the after-glowing spot (Fleckes) on the rotary body surface.

A reversal of the principle is likewise possible, so that a light source is moved relatively to a fixed, after-glowing body and the tracer trajectory is tracked on this.

A first essential aspect of the invention lies therefore in that an arrangement is chosen in which neither a complicated structuring of a ball or of another movable object, nor the erasing of a marking, or even a complicated evaluating unit is required, but a simple fading-out (Ausklingen) of a marking signal is used. For this an after-glowing surface is used, while on this a light spot of predetermined location is generated, and its position is detected in the rotary body movement. There is applied, therefore, a quasi self-erasing marking that, insofar as possible, is tracked up to its self-extinction. While the invention is useful especially for spherical movement bodies, its use is also possible with flat geometries.

Although it is possible, for example, to construct the underside of a joystick or the like with an after-glowing surface, as a rotary body which, moreover, must allow a rotation in one direction only, typically the rotary body will have a spherical shape. Another preferred use is as angle-givers, with which an axial position is to be detected.

It is especially advantageous if the rotary body has a small diameter. Diameters of under 4 mm are preferred, especially preferred are those of not more than 2 mm. This makes it possible, with conventional movement course such as the typical shifting of a mouse on a surface, fort the after-glowing to be so far distant from the illumination point that an adequately high resolution is achieved. If the ball has a radius of even only about 0.5 mm, a very compact ballpoint pen-like device can be constructed, in which the ball is rolled off over a surface in the manner of a stylus. The ball size makes it possible, there, to use a movement-giver in stylus form, with a manual operation usual for typical writing instruments. This is especially advantageous when a data detection is provided such that, from the movement trajectory of especially a stylus-form mouse, a writing stroke is identified. This inscription can be used directly in order to make possible the input of whole written texts with a device which can be moved like a conventional writing instrument.

In a preferred example of execution the movement giver will represent a computer mouse, a trackball or a mouse stylus (Mausstift), i.e. a device in stylus form with a frontally arranged rotary body, in which keys or the like can be arranged on the grip body itself, in order to signal a mouse click. In an alternative and/or supplementary manner, a pressing of the mouse stylus on its tip can be used for the keying. It is obvious that two rotation-givers can be provided on the opposite ends of the mouse stylus, say, in order to perform a writing and erasing function, without its being necessary for a corresponding menu point to be called upon in a computer program.

It is preferred if the after-glowing on the surface dies out in at the most 60 milliseconds, preferably in less than 20 milliseconds to an intensity of 1/e of the initial intensity on illumination. The maximum time of 60 ms is yielded as advantageous there from typical manual-movement runs when working with the device according to the invention. Such a short dying-out time ensures that the rotary body also, and precisely with reverse movement, does not have any memory effect, but can be marked again after a certain movement.

It is further preferred if the after-glowing surface falls to a value of 1/e in at the shortest 1 millisecond, but preferably in at least 5 milliseconds. Afterglow times lying below this are so brief that the marked (rotary) body at conventional speeds of movement will possibly not be far enough removed from the illumination point to make it possible to measure the movement.

It is possible to make the after-glowing surface of glass that is doped with a rare earth compound, in which case, for example, erbium-doped glass is to be used. An alternative lies in using zinc sulfide, especially activated zinc sulfide, for the after-glowing surface. It is obvious that it is possible, instead of an only superficially coated (rotary) body, directly to use a (rotary) body formed massively of after-glowing material. This holds with special advantage in the case of small (rotary) bodies, which are easily producible, at least essentially, as homogeneous (rotary) bodies.

It is preferred to execute the position-sensitive photo-detector by means of a segmented photo-diode. There can be used especially a four-quadrant diode, in which in a preferred form of execution the illumination of the ball occurs through a central opening in the photo-diode. It is then possible to detect—by determination of the relative current or signal strength in the individual quadrants—how the light spot moves, and therewith does the (rotary) body moves.

Further, it is preferred, with the use of a segmented photo-detector, when the evaluation signals from all the segments can be drawn upon, by which, then preferably a new marking is always set should the light spot of even one of the segments no longer light up. This can be the case especially through the running-out of the light spot from the observation field when using a four-quadrant diode with rapid movement or, especially through the dying-out of the luminescence when using it with slow movement.

It is further preferred to allocate to the light source a pulsed current supply, in which case the current supply is preferably designed always to trigger a light pulse emission when a certain multiple of the afterglow time has elapsed and/or when the light spot is not detected in the desired manner, for example by all four quadrants of a four-quadrant diode, so that the (rotary) body surface is illuminated periodically and/or in response to a relative (rotary) movement and/or speed.

Further it is preferred to send signals relating to the rotation of the rotary body and possibly to the pressing of keys, by radio and/or over an infrared transmission interval for transmission to a computer or the like.

The invention is described in the following, only by way of example, with the aid of the drawing. In this:

FIG. 1 shows a movement-giver according to the present invention.

FIG. 2 a detail in FIG. 1;

FIGS. 3 to 7 further forms of execution of the invention.

According to FIG. 1, a movement-giver 1 designated in general by 1 comprises a rotary body 2 and a rotation sensor 3 with a light source 3a and a position-sensitive photo-detector 3b, which is obtained by a four-quadrant diode with central opening 3d. Around the central opening there are arranged four quadrants, which are designated as A, B, C, D (FIG. 2).

The rotary body 2 is formed by a turnably borne (bearing not shown) ball, which consists of erbium-doped glass, so that it has an after-glowing surface 2a. The doping material is chosen so that there is yielded a 1/e dying-out time of 10 milliseconds. The photo-detector is especially sensitive to the wavelength of the afterglow light, but not to the shorter wavelength of the luminous diode.

The light source 3a consists of a pulse-fed luminous diode (current supply not shown), the light 3c of which falls essentially from the rear side of the photo-detector 3b through the central opening 3d. The central opening 3d in the photo-detector 3b is so dimensioned that the light 3d passing through it generates a spot 2b well detectable on the ball 2 by means of the photo-detector 3b.

Further there is provided an evaluating circuit and a signal transmission unit, not shown, for transmission of the evaluation signals to a central computer unit or the like. Evaluating circuit and signal transmission unit are supplied with energy over a battery which is integrated with this in the smallest possible space, as is known per se to the specialist. The whole arrangement is installed in a stylus-type structure, in which the stylus end is formed by the ball side turned away from the photo-detector LED arrangement.

When the turnably borne ball 2 is moved over a surface 4 and is carried along in this movement, the rotation of the ball can be determined as follows:

First of all the luminous diode 3a is briefly energized, whereby a brightly after-glowing spot 2b is formed on the ball 2. The shortwave excitation light is not detected with the position-sensitive photo-detector. As long as the ball is not being moved, this luminous spot lies centrally under the position-sensitive photo-detector 3b, so that all four quadrants A, B, C, D are uniformly illuminated and correspondingly generate light signals [A]. [B]. [C]. [D]. The signals die out with the afterglow. After a sufficient dying-out, a further light spot is generated. This continues, for example every 10 millisecond, as long as the ball does not move.

If now the ball is moved, for example in Y-direction, then the relative signal [A], [B] increases on the quadrants A, B, while it relatively decreases on the quadrants C, D. Simultaneously the total signal [A], [B], [C], [D] through the dying-out of the afterglow decreases absolutely as much. In a corresponding manner, a movement in positive X-direction leads to a relative rise of the current strengths on the segments B, D, while the relative signals on the quadrants A, C decrease.

The coordinates that the spot occupies can be calculated (approximately), ignoring effects caused by the curvature of the ball, according to:

$$X=(([B]+[D])-([A]+[C]))/([A]+[B]+[C]+[C])$$

$$y=(([A]+[B])-([C]+[D]))/([A]+[B]+[C]+[D])$$

The absolute coordinates are yielded by integration of the path stretches detected from the individual markings.

As soon as the light spot 2b has moved so far that no signal is any longer received on one of the quadrants, or that the signal falls below a certain strength, a new marking is set. For this the luminous diode LED 3a is again energized, whereby a new light spot forms on the ball. It is then possible to determine the further movement of this spot. It is obvious that with the procedure described an energizing occurs under time control and/or in dependence on movement.

While the above concrete formulas are given for the determination of the coordinates, there can also be chosen other ways of calculating.

Figure 4:
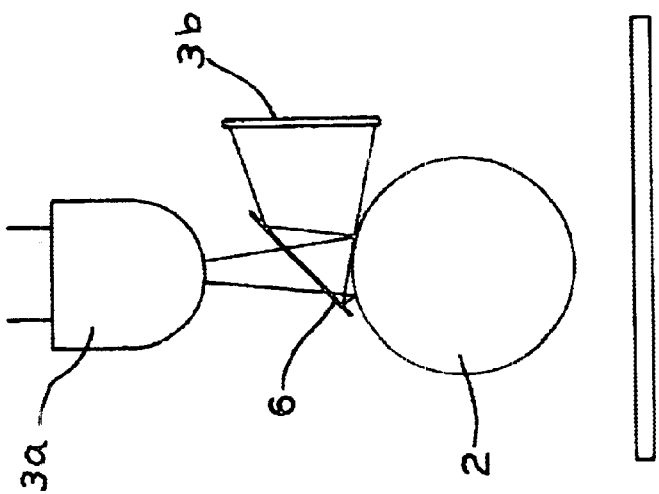
Figure 3:
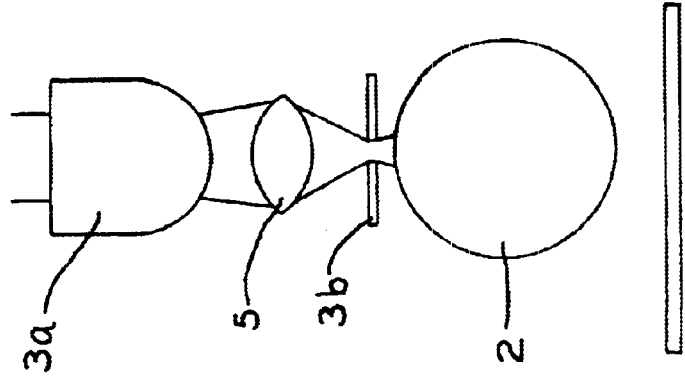

FIGS. 3, 4 and 5 show alternative arrangements for the illumination. According to FIG. 3, the light from an LED 3a is bundled by a lens 5, with which the locus lies about in the plane of the four-quadrant diode. In this manner the four-quadrant diode is also not disturbed by the rearward illumination, for example warmed up, and it is possible to achieve high illumination densities on the ball 2.

In FIG. 4 there is provided a beam divider 6 in the beam path, between the LED 3a and the ball 2. The illumination light passes through the beam divider 6, while the light reflected from the luminous spot is reflected onto the position-sensitive photo-detector 3b.

In FIG. 5 there is shown a further illumination arrangement with a laser 30a that projects light through a photo-conductor 31 to the position-sensitive photo-detector 3b from where it passes onto the ball 2. Instead of the laser, obviously, other light sources than LED's are usable.

Figure 6:
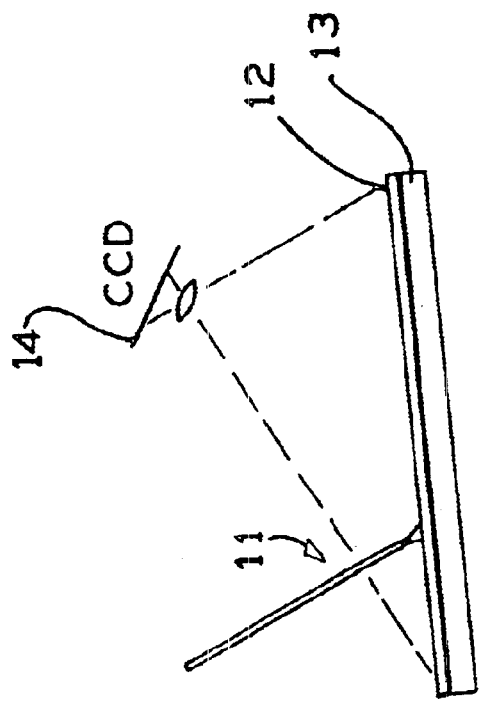

In FIG. 6 an arrangement is shown in which a pulsed light source 11 is used, which is moved over a provided after-glowing surface 12 of a fixed body 13. Furthermore, a remotely arranged CCD 14 is present, which detects the luminous surface. With this arrangement, drawing boards can be executed. By the creation of after-glowing machine parts, such as even stamping machines or other manufacturing machines, for example, there can also be executed a machine control according to the invention.

Figure 7:
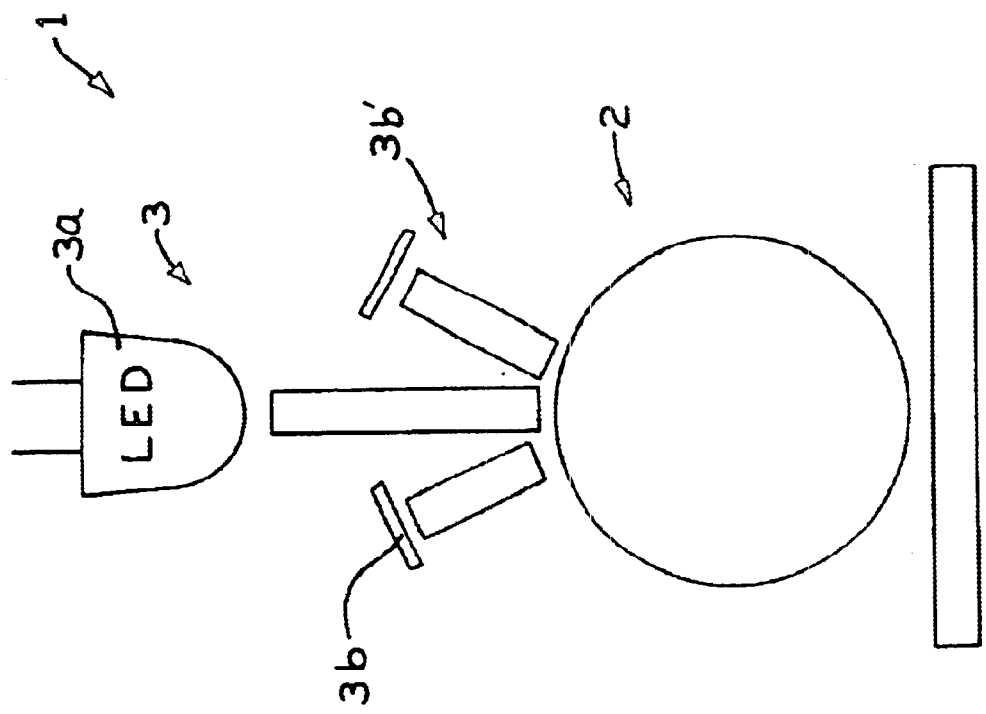

In FIG. 7 a sensor arrangement is shown, in which the position-sensitive sensor is executed by means of four light conductors 3b'. The light conductors take up the light on the ball and conduct it, for example, to four photo-diodes 3b.

What is claimed is:

1. Movement-giver with a body-movement sensor pair that includes a body and a movement sensor for determining a relative movement of a body surface and of the movement sensor, characterized in that the body surface defined by the body comprises an after-glowing surface, the movement sensor has a light source for the generation of an after-glowing spot on the body surface, the body movement sensor pair is constructed for a relative movement of the after-glowing surface and of the light source, and the movement sensor further has a position-sensitive photo-detector which is designed to detect the position of the after-glowing spot.

2. Movement-giver with a movable body and a movement sensor for the detection of a body rotation movement, characterized in that the movable body has an after-glowing surface and the movement sensor has a light source for the generation of an after-glowing illumination spot on the movable body, and a position-sensitive photo-detector that enables it to track the movement of the after-glowing spot on the surface of the movable body.

3. Movement giver according to claim 2, characterized in that the movable body is a rotary body and the movement sensor is a revolution sensor for the detection of the rotary body rotation.

4. Movement-giver according to claim 3, characterized in that the rotary body is a ball.

5. Movement giver according to claim 3, characterized in that the rotary body has a diameter of not more than 4 mm, particularly of not more than 2 mm.

6. Movement-giver according to claim 2, characterized in that the movable body has a diameter of not more than 0.5 mm.

7. Movement-giver according to claim 2, characterized in that it is constructed as a trackball, a computer mouse, or a mouse pin (stylus).

8. Movement-giver according to claim 2, characterized in that the after-glowing surface has a lie dying-out time of less than 60 milliseconds, preferably of less than 20 milliseconds.

9. Movement-giver according to claim 2, characterized in that the after-glowing surface has a 1/e dying-out curve of at least one millisecond, preferably has an after-glow time of at least 5 milliseconds.

10. Movement-giver according to claim 2, characterized in that the after-glowing surface is formed of rare-earth doped glass, especially of erbium-doped glass.

11. Movement giver according to claim 2, characterized in that the after-glowing surface is formed by activated zinc sulfide.

12. Movement-giver according to claim 2, characterized in that the movable body is formed as a solid mass of after-glowing material.

13. Movement-giver according to claim 2, characterized in that the position-sensitive photo-detector is made as a segmented photo-diode.

14. Movement giver according to claim 2, characterized in that the illumination occurs through the photo-detector or, respectively, through an opening therein.

15. Movement giver according to claim 2, characterized in that a pulsed-current supply is allocated to the light source.

16. Movement giver according to claim 2, characterized in that a current supply is designed to illuminate the surface periodically and/or in response to movement.

17. Movement-giver according to claim 2, characterized in that before the position-sensitive detector there is arranged a plurality of light conductors which are designed to receive light from the after-glowing surface, and to supply it to the position-sensitive photo-detector.

18. Movement giver according to claim 2, characterized in that the signal transmission of the evaluation signals occurs by radio and/or over infrared diodes.

* * * * *

UNITED STATES PATENT AND TRADEMARK OFFICE
CERTIFICATE OF CORRECTION

PATENT NO. : 6,686,584 B2
DATED : February 3, 2004
INVENTOR(S) : Nachigall et al.

It is certified that error appears in the above-identified patent and that said Letters Patent is hereby corrected as shown below:

Column 6,
Line 11, delete "lie" and substitute therefor -- l/e --

Signed and Sealed this

Fifteenth Day of June, 2004

JON W. DUDAS
*Acting Director of the United States Patent and Trademark Office*